(12) United States Patent
Coon

(10) Patent No.: US 7,975,582 B1
(45) Date of Patent: Jul. 12, 2011

(54) STRIP CUTTING DEVICE AND METHODS OF USE

(76) Inventor: Norman Coon, Morrison, CO (US)

( * ) Notice: Subject to any disclaimer, the term of this patent is extended or adjusted under 35 U.S.C. 154(b) by 0 days.

(21) Appl. No.: 12/250,118

(22) Filed: Oct. 13, 2008

(51) Int. Cl.
*B26B 13/00* (2006.01)
*B23D 25/00* (2006.01)
*B26D 7/06* (2006.01)

(52) U.S. Cl. ............. 83/130; 30/265; 83/449; 83/446; 83/436.45

(58) Field of Classification Search .............. 30/265; 83/13, 56, 130, 500, 614, 501–503, 449, 83/436.1, 446, 436.15, 436.45, 436.7, 436.76
See application file for complete search history.

(56) References Cited

U.S. PATENT DOCUMENTS

| 255,102 | A | * | 3/1882 | Danheim ................. 30/265 |
| 541,463 | A | | 6/1895 | Thompson |
| 1,098,671 | A | | 6/1914 | Lundy |
| 1,508,869 | A | * | 9/1924 | Astrup ..................... 30/264 |
| 1,511,892 | A | * | 10/1924 | Lusby ..................... 30/265 |
| 1,720,305 | A | * | 7/1929 | Tjernlund ................. 30/265 |
| 1,913,951 | A | * | 6/1933 | Possnett .................. 30/265 |
| 2,276,365 | A | * | 3/1942 | Angel ..................... 30/265 |
| 2,780,253 | A | * | 2/1957 | Joa ...................... 144/248.7 |
| 3,006,401 | A | * | 10/1961 | Wognum et al. ............ 72/162 |
| 3,380,158 | A | * | 4/1968 | Du Bois ................... 30/233 |
| 3,545,599 | A | * | 12/1970 | Barber et al. ............. 198/807 |
| 3,687,273 | A | * | 8/1972 | Macone et al. ........... 198/806 |
| 3,709,081 | A | | 1/1973 | Rush |
| 3,710,444 | A | * | 1/1973 | Fishman ................... 30/265 |
| 3,854,315 | A | * | 12/1974 | Winkler ................... 72/165 |
| 3,906,629 | A | | 9/1975 | Fuchs, Jr. |
| 3,927,814 | A | * | 12/1975 | Holm ..................... 242/615.2 |
| 4,001,936 | A | | 1/1977 | Matsushita |
| 4,275,500 | A | | 6/1981 | Speer, Jr. et al. |
| 4,283,853 | A | | 8/1981 | Fazzini |
| 4,381,605 | A | | 5/1983 | Holm |
| 4,403,533 | A | * | 9/1983 | Cox et al. ................ 83/56 |
| 4,574,480 | A | * | 3/1986 | Dunn ..................... 30/240 |
| 4,599,929 | A | * | 7/1986 | Dutina ................... 83/821 |
| 4,693,004 | A | * | 9/1987 | Plana ..................... 30/265 |
| 5,027,515 | A | | 7/1991 | Murdock |
| 5,503,053 | A | | 4/1996 | Onishi et al. |
| 5,582,053 | A | * | 12/1996 | Chubb et al. ............... 72/294 |
| 5,845,554 | A | | 12/1998 | Kozyrski |
| 5,899,000 | A | * | 5/1999 | Break et al. ............... 30/240 |
| 6,019,023 | A | | 2/2000 | Betourne |
| 6,298,561 | B1 | | 10/2001 | Decker |
| 6,893,528 | B2 | | 5/2005 | Middelstadt et al. |
| 7,028,596 | B1 | * | 4/2006 | Langhans .................. 83/503 |
| 7,089,669 | B2 | * | 8/2006 | Fritz ..................... 30/265 |
| 7,117,998 | B2 | * | 10/2006 | Krapf ..................... 211/45 |
| 2003/0150305 | A1 | * | 8/2003 | Fisher .................... 83/13 |
| 2003/0233756 | A1 | | 12/2003 | Muhlebach |
| 2006/0150794 | A1 | | 7/2006 | Kim et al. |
| 2006/0156594 | A1 | * | 7/2006 | Dansby ................... 40/124.16 |

* cited by examiner

*Primary Examiner* — Ghassem Alie
*Assistant Examiner* — Bharat C Patel
(74) *Attorney, Agent, or Firm* — Albert Haegele; Leyendecker & Lemire, LLC

(57) ABSTRACT

A device for cutting flat strips of desired width from relatively elongate material is described. Methods of using the strip cutting device are also described. Embodiments of the strip cutting device are adapted to readily cleave a leg from L-shaped material to produce flat strips. Some embodiments are adapted to precisely and accurately cleave flat strips of material to produce narrower flat strips.

18 Claims, 10 Drawing Sheets

US 7,975,582 B1

STRIP CUTTING DEVICE AND METHODS OF USE

FIELD OF THE INVENTION

The present invention relates generally to devices and methods for precisely cutting strips from relatively elongate stock material, including, but not limited to, L-shaped vinyl stock material used for trimming windows installed in buildings.

BACKGROUND

Installers of windows in residential structures and other buildings usually employ finishing trim to produce a finished appearance. The finishing trim is typically used to span, and thus conceal, gaps between windows and building structure, and is utilized in both interior and exterior application. Some finishing trim and trim material comprises polyvinyl chloride (vinyl), but other plastic material may also be used. Such plastic material can be cut, albeit with difficulty, by use of hand held cutting instruments such as utility knives. Finishing trim and trim material also sometimes comprise relatively soft metal such as aluminum or aluminum alloys, which are more difficult to cut, and may be very difficult if not impossible to cut with a hand held utility knife.

Installers typically cut vinyl finishing trim from L-shaped material, generating flat strips in the process. In order to cut flat strips from the L-shaped stock, installers usually use utility knives or similar hand-held cutting instruments. Utility knives may also be used to generate finishing trim with a desired width from flat strips that are too wide.

However, cutting the plastic stock material by hand with utility knives and similar devices is difficult and produces undesirable results, including irregular edges and wasted material. The primitive and difficult cutting by hand is hard on installers as well, causing fatigue and sometimes resulting in repetitive motion injury. Installers sometimes use a straight-edge to assist hand cutting, but undesirable results are still frequent.

DETAILED DESCRIPTION

Figure 1:
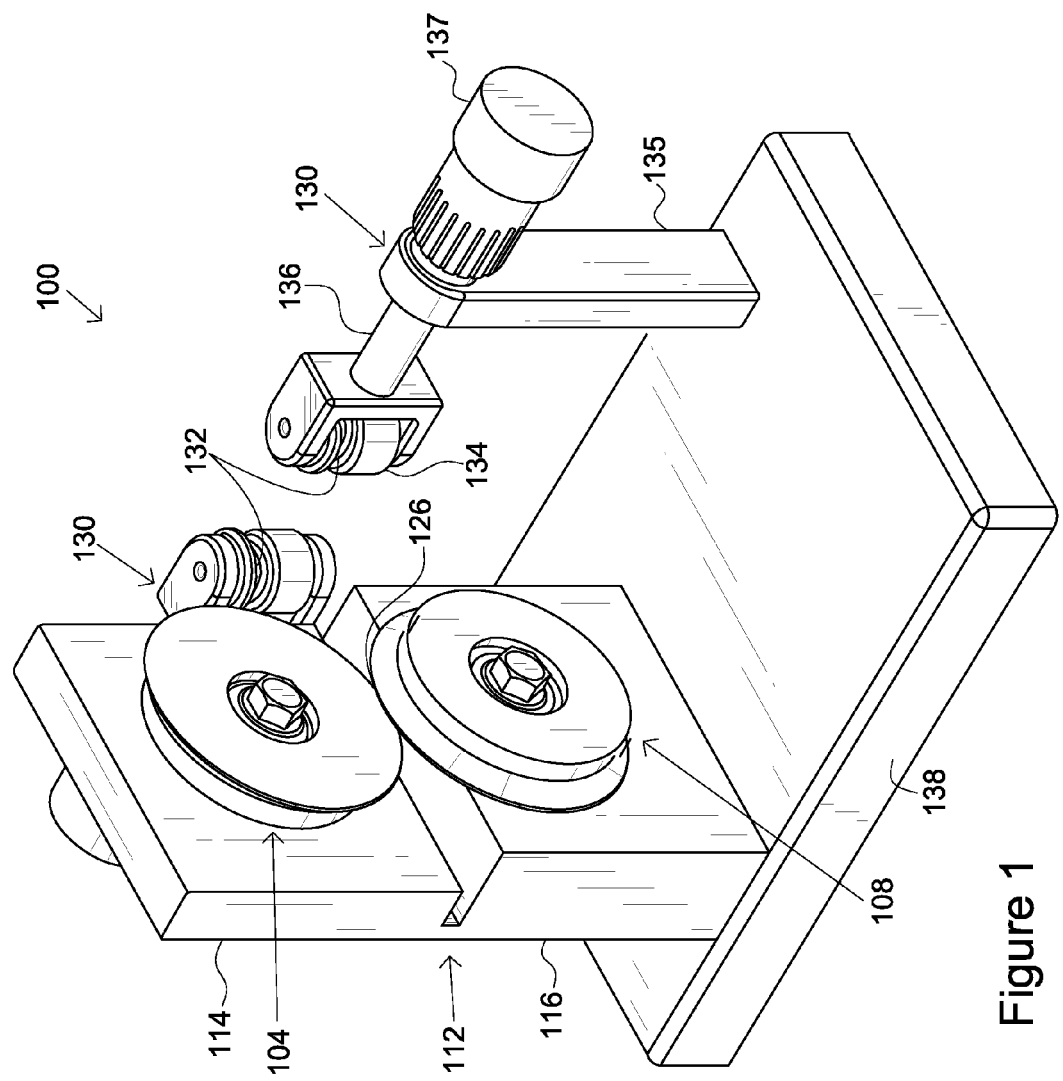
FIG. 1 is an isometric view of a strip cutting device according to one embodiment of the present invention.

Embodiments of the present invention include a strip cutting device comprising a cleaving apparatus and a feed channel. The cleaving apparatus and feed channel are oriented such that when a first leg of a piece of L-shaped material is fed into and through the feed channel, the piece of L-shaped material is cleaved along a line where the first leg and a second leg join; the second leg is thereby resected from the first leg. An elbow, comprising the first leg coupled directly to the second leg at a substantially 90° angle, is thus eliminated, and two flat strips result.

In some embodiments, the cleaving apparatus comprises a blade, a cutting wheel or wheels, or other cutting means adapted to split, cut, bisect, excise, or otherwise cleave solid phase materials, the solid phase materials including, but not limited to, polymers, plastics, metals, metal alloys, composites, and cellulosic materials. Some embodiments comprise feed channels or similar structures adapted to direct L-shaped plastic window trim or stock material at or through a cleaving area such that precise, accurate, excision is readily achieved by pushing or drawing the L-shaped material through the strip cutting device. The cleaving area comprises a site on the cleaving apparatus where L-shaped material, a flat strip, or other material being cleaved, engages the cleaving apparatus. In some variations, the precise, accurate, excision removes a leg from L-shaped shaped stock material to produce two flat strips.

Using embodiments of the strip cutting device, leg resection is relatively easily and accurately executed, and results in precise, highly regular edges (factory edges). A user typically employs a modicum of care to direct a portion of the first leg into the feed channel, whereupon some force is used to push the piece of L-shaped material into the cleaving apparatus as the first leg proceeds through the feed channel and the cleaving apparatus begins cleaving the L-shaped material. Once a portion of the first leg of the piece of L-shaped material is disposed in the feed channel, the cleaving apparatus engages the L-shaped material at a desired location by default, the desired location being a junction of the first leg and the second leg. Moreover, once a few inches of L-shaped material have been fed through the strip cutting device, and a few inches of cropped trim comprising two flat strips have therefore emerged from the device, the user need only grasp the emerging cropped trim and pull the remaining portion of the L-shaped material through the strip cutting device, to get precise resection and "factory edges." The user does not need to pull the emerging cropped trim with particular care to get the aforementioned precise resection with factory edges.

Embodiments of the strip cutting device further comprise adjustable jockey assemblies adapted to steer flat strips into the cleaving apparatus with precision and accuracy, thereby enabling a user to cut the flat strips down to a desired width. The result is a factory edge (a straight, highly regular edge) on a flat strip with a desired width. A flat strip with a desired width that has emerged from a strip cutting device is also referred to as a finishing strip in the present specification and appended claims.

Embodiments of the strip cutting device are typically not power tools; they are not powered by electricity and are not motor driven. A user is typically able to provide all the power necessary to operate the strip cutting device using his or her strength. Accordingly, the strip cutting device is adapted to operate without regard to availability of supplemental power.

Similarly, embodiments of the strip cutting device are relatively simple and inexpensive to manufacture, operate, and maintain. Embodiments of the strip cutting device are typically, but not necessarily, mounted securely to structures such as a sawhorse, work table, workbench, a bed, bumper, or other relatively solid structure on a truck or other work vehicle, or a work trailer or equipment trailer.

Some embodiments of the strip cutting device may be operated by use of supplemental power such as by electric motor powered cleaving apparatus or jockey assemblies. Supplemental power increases device expense and complexity, but can make operating the device, which is relatively easy in unpowered embodiments, even easier.

Embodiments of the strip cutting device are typically adapted to cutting relatively soft polymeric material such as, but not limited to, polyvinyl chloride, and relatively soft metals such as aluminum or aluminum alloys. Some embodiments are adapted to cutting harder material such as galvanized sheet metal or other iron alloys.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct connection between the identified elements, components, or objects. Often the manner of the coupling will be related specifically to the manner in which the two coupled elements interact.

As applicable, the term "about," as used in this specification and appended claims, refers to a margin of ±20% unless otherwise indicated. It is to be appreciated that not all uses of "about" are quantifiable such that the referenced ranges can be applied.

As applicable, the term "approximately," as used in this specification and appended claims, refers to a margin of ±10% unless otherwise indicated. It is to be appreciated that not all uses of "approximately" are quantifiable such that the referenced ranges can be applied.

The term "factory edge" or "factory edges," as used in this specification and appended claims, refers to an edge or edges, disposed on trim, finishing trim, stock material, L-shaped material, or similar relatively long, narrow items, which is substantially free of conspicuous irregularities, such that the edge looks like is was produced by a factory process rather than cut by hand. Moreover, factory edges comprise substantially reproducible angles, which are typically, but not necessarily, substantially 90°. A 90° factory edge angle results where a cutting angle is 90°, which is to say that an angle of incidence at which a cleaving apparatus engages a surface of material being cleaved is substantially 90°. The term "factory edge" is familiar to a person of ordinary skill in the art, and distinguishes between relatively regular edges produced by precision cutting means (factory edges) and relatively irregular edges, exhibiting poor precision/reproducibility, produced by hand cutting in the field. The term "freshly cut factory edges" refers to factory edges generated by passing material through a strip cutting device of the present invention.

The terms "L-shaped," "L-shaped material," and "L-shaped stock material," as used in this specification and appended claims, refers to dimensionally stable material disposed along two perpendicular planes, a first and a second plane. A first leg comprises the dimensionally stable material disposed on the first plane, and is directly coupled to and continuous with a second leg comprising the dimensionally stable material disposed on the second plane. Both inside and outside substantially 90° corners are created at an intersection of the first and second legs. Examples of L-shaped material include pieces consisting essentially of vinyl, and comprising first and second legs that are about ¼ inch to 3 inches wide and are about 2 feet to 20 feet long. In one example, a piece of vinyl L-shaped material is 10 feet long and has a first leg that is 1 inch wide and 10 feet long, and a second leg that is 2 inches wide and 10 feet long.

The term "feed channel," as used in this specification and appended claims, refers to a chamber bounded on at least two opposite sides by dimensionally stable material, and which is substantially open on at least two opposite ends.

The term "secure and precisely guide," as used in this specification and appended claims, refers to constraining and guiding a flat strip by use of flat strip feeding means is such a way that the flat strip is held in place along one axis, but is relatively mobile along an other axis, the other axis intersecting the cleaving area. Accordingly, the flat strip feeding means "secures and precisely guides" the flat strip as it engages the cleaving area.

A First Embodiment Strip Cutting Device

A first embodiment strip cutting device 100 is illustrated in FIGS. 1 through 9. The first embodiment strip cutting device comprises a first cutting wheel 104 and a second cutting wheel 108, the first and second cutting wheels together forming a cleaving apparatus. The first embodiment strip cutting device further comprises a mounting block 112, to which the first and second cutting wheels are securely mounted, and two jockey assemblies 130, the two jockey assemblies forming an opposing pair of jockey assemblies. The pair of jockey assemblies exemplifies flat strip feeding means adapted to precisely feed flat strip material into the strip cutting device. The first and second cutting wheels are coupled to the mounting block by axles on which the cutting wheels rotate relatively freely, their axes of rotation being substantially parallel. The mounting block and jockey assemblies are securely coupled to a base plate 138.

Embodiments of the first and second cutting wheels 104, 108 have an overlap at the cleaving area 126 of preferably about 0 to ½ inch, more preferably about 1/64 to ¼ inch, and most preferably about 1/32 inch. Where the overlap is about 1/32 inch and the cutting wheel edges comprise high carbon steel or hard stainless steel, the first embodiment strip cutting device is well adapted to cutting virgin vinyl about 0.025 to 0.040 inch thick. Where the overlap is about ⅛ inch and the cutting wheel edges comprise tungsten carbine steel (Vickers hardness typically about 2000 or higher), embodiments of the strip cutting device are adapted to cut 10 gauge galvanized sheet metal. The first cutting wheel 104 and the second cutting wheel 108 of the first embodiment strip cutting device 100 have a diameter of 3.5 inches, an overlap of 1/32 inch, and comprise high carbon steel; the first embodiment strip cutting device is therefore well adapted to cutting vinyl, but is poorly adapted to cutting 10 gauge sheet metal.

Figure 2:
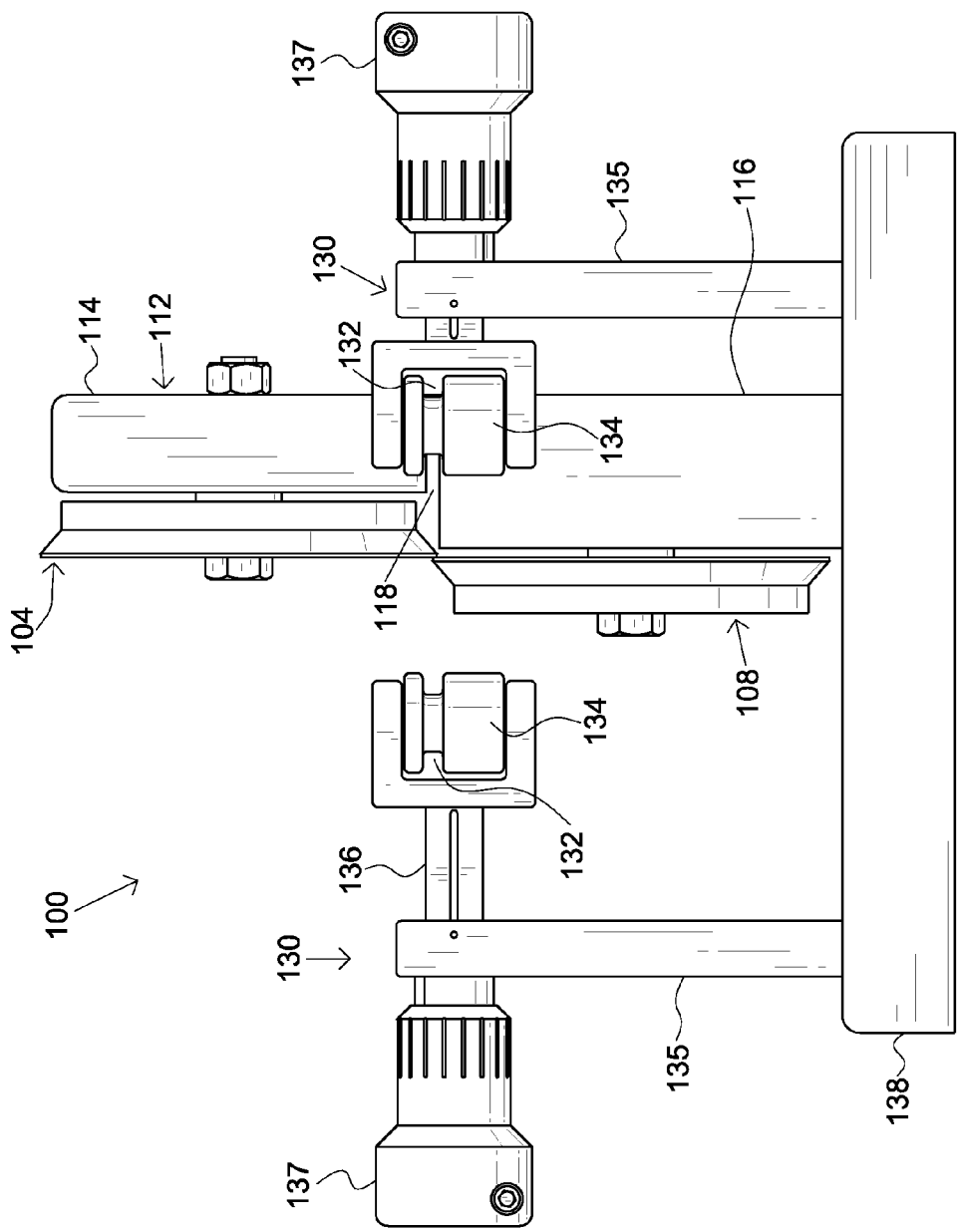
FIG. 2 is a front view of a strip cutting device according to one embodiment of the present invention.
Figure 3:
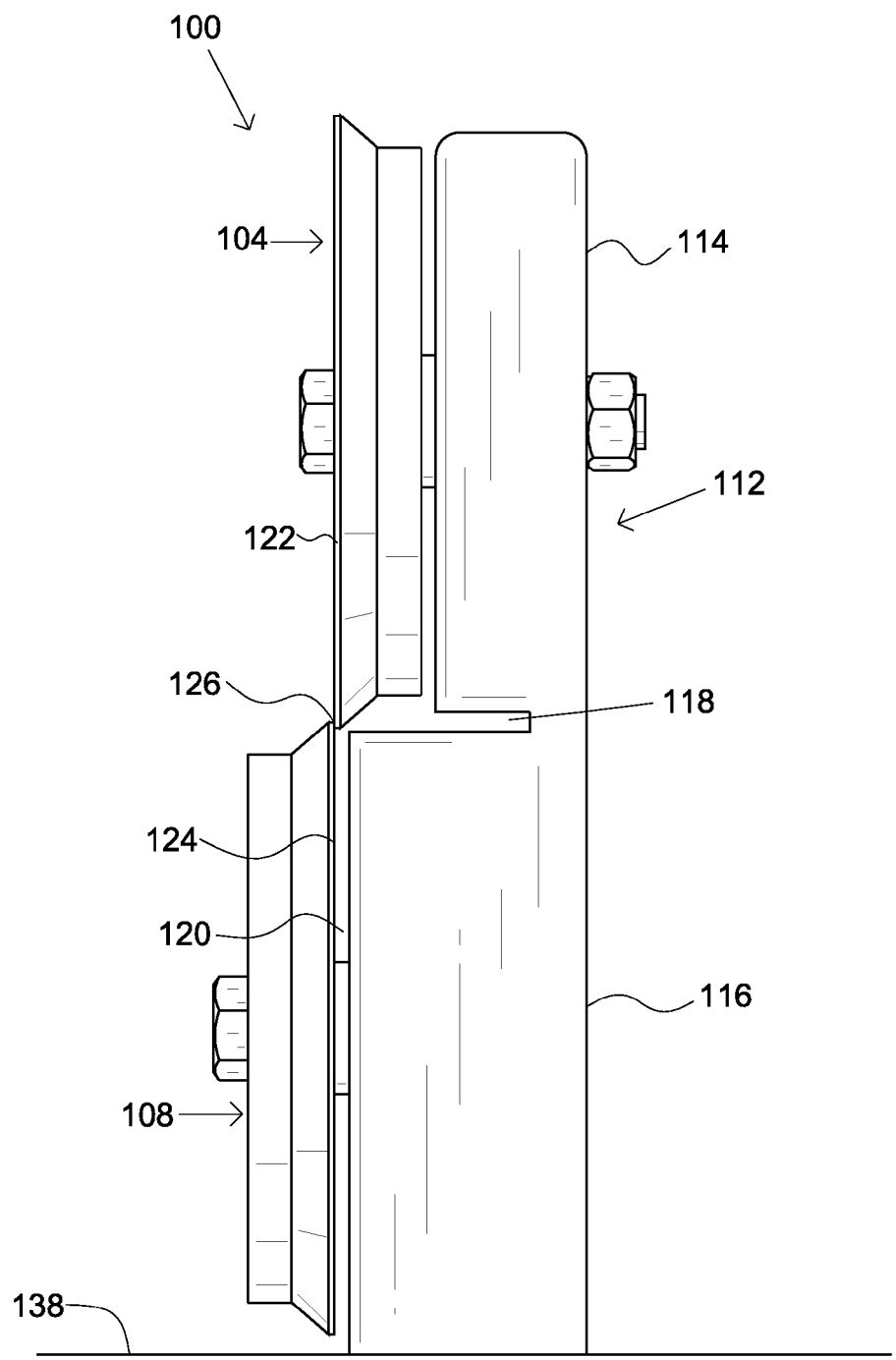
FIG. 3 is a front view of a strip cutting device according to one embodiment of the present invention.
Figure 4:
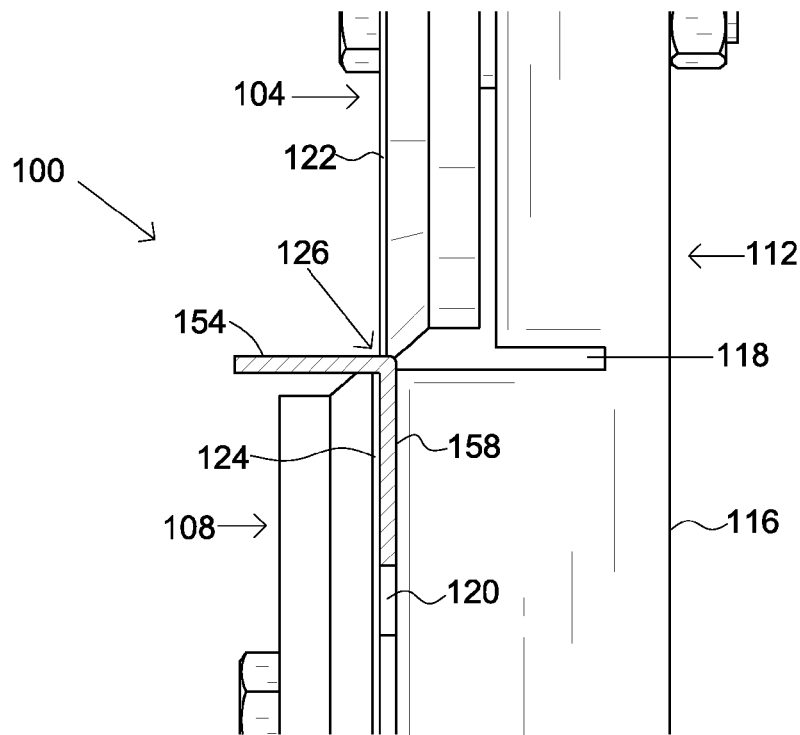
FIG. 4 is a front view of a strip cutting device, with a piece of L-shaped material in the device, according to one embodiment of the present invention.
Figure 5:
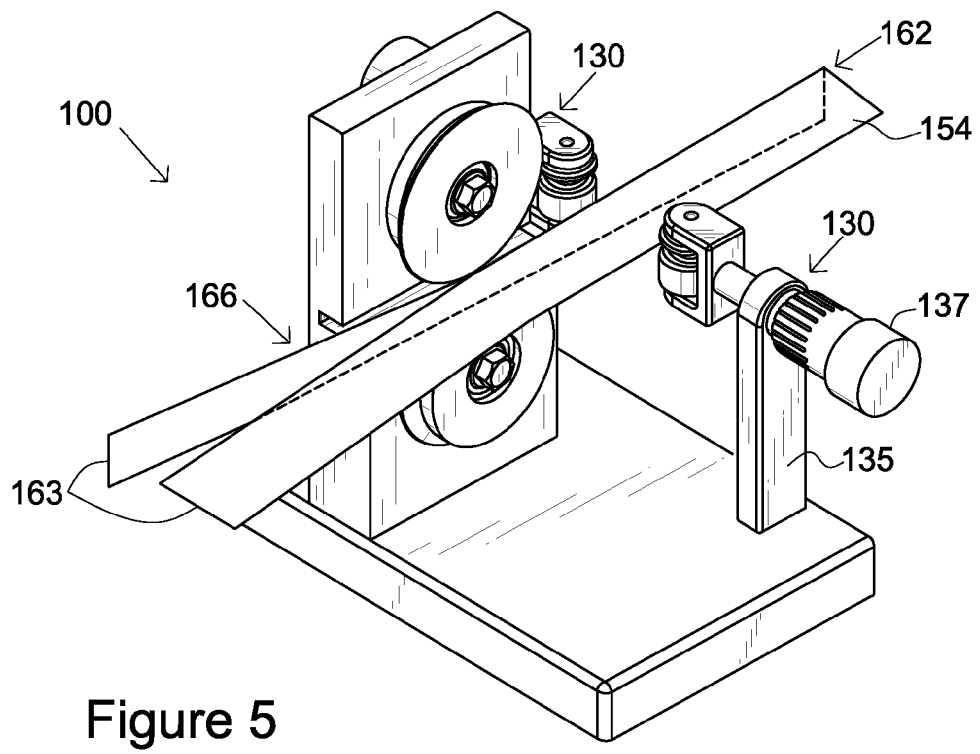
FIG. 5 is an isometric view of a strip cutting device, with a partially cleaved piece of L-shaped material in the device, according to one embodiment of the present invention.

The mounting block 112 of the first embodiment strip cutting device comprises an upper block portion 114 and a lower block portion 116, the upper and lower block portions being delineated by a lateral cavity 118. The lateral cavity is best illustrated in FIGS. 2, 3, and 4. Jockey assemblies 130 have been omitted in FIGS. 3 and 4 in order to better illustrate the lateral cavity.

As illustrated in FIGS. 2, 3, and 4, the first embodiment strip cutting device further comprises a feed channel 120, the feed channel comprising a cavity bounded on one side by the lower block portion 116 and on an opposite side by the second cutting wheel 108, the lower block portion and second cutting wheel being constraining members of the feed channel. A top of the feed channel is further bounded by a periphery of the first cutting wheel 104, the periphery of the first cutting wheel comprising a first cutting edge 122. A channel width of the feed channel is a distance between constraining members on opposite sides of the feed channel, constraining members of the first embodiment feed channel being the lower block portion and the second cutting wheel, and is preferably 0.005 inch to 1.25 inch, more preferably 0.010 inch to 0.50 inch, and most preferably about 0.05 inch. Where the channel width of the first embodiment is approximately 0.050 inch, it is sized to accommodate, yet position relatively precisely, the first leg of L-shaped material with typical thickness of about 0.025 to 0.040 inch. In some embodiments, the feed channel has a channel width that is adjustable, allowing it to accommodate yet position relatively precisely, L-shaped material of varied thickness.

The feed channel is open on opposing ends, a feature illustrated in FIG. 3, where a viewer's line of sight is through open front and back ends of the feed channel In FIG. 4, the feed channel is partially filled and obscured by a first leg 158 of a piece of L-shaped material. The feed channel is disposed in close proximity to a cleaving area 126, the cleaving area being adapted to cleave trim material, and being formed by the first cutting edge 122 and a second cutting edge 124, the first and second cutting edges overlapping slightly to facilitate cleaving trim material.

The close proximity of the feed channel to the cleaving area facilitates excising the second leg 154 (best illustrated in FIGS. 4 and 5) from the piece of L-shaped material when the first leg 158 is disposed in the feed channel 120 (best illustrated in FIG. 3) and the piece of L-shaped feed material is propelled through the strip cutting device 100. Orientation of the feed channel relative to the cleaving area of the first embodiment cutting device results in a substantially 90° cut.

Figure 7:
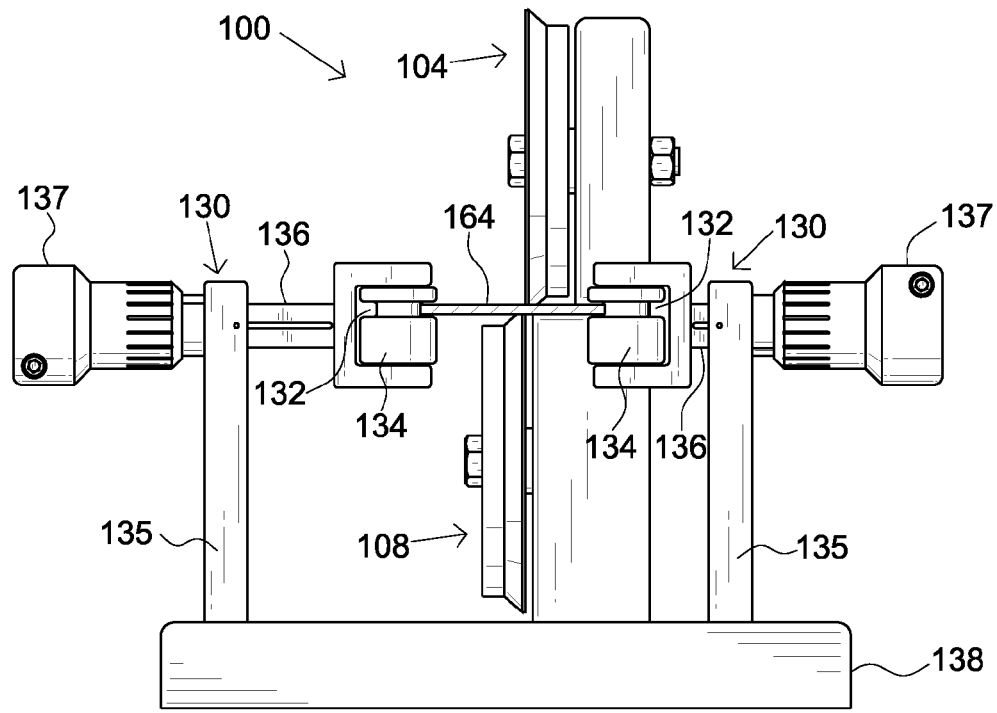
FIG. 7 is a front view of a strip cutting device, with a flat strip in the device, according to one embodiment of the present invention.
Figure 8:
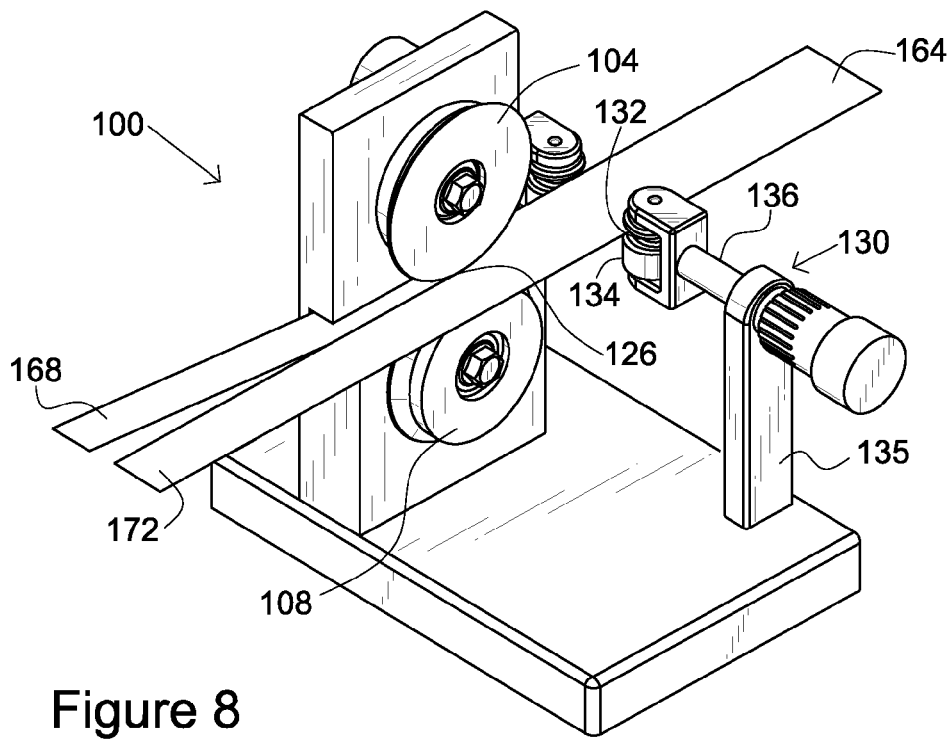
FIG. 8 is an isometric view of a strip cutting device, with a partially cleaved flat strip in the device, according to one embodiment of the present invention.

Similarly, the lateral cavity 118 (best illustrated in FIGS. 2, 3, 4, and 7) is in close proximity to the cleaving area 126, which facilitates excising an extraneous strip 168 from a flat strip 164 that is too wide for its intended use, to produce a piece of finishing trim 172 (best illustrated in FIGS. 7 and 8).

FIGS. 4, 5, and 6A through 6D illustrate a first embodiment strip cutting device 100 excising the second leg 154 from the piece of L-shaped material 162 to produce cropped trim 166, the cropped trim comprising two flat strips 163. When the strip cutting device is used to cleave a piece of L-shaped material, the jockey assemblies 130 are typically not used. A cutting angle illustrated in FIG. 4 is substantially 90°; that is, the cutting wheels 104, 108 engage the piece of L-shaped material at an angle of incidence of substantially 90°. A person or ordinary skill in the art recognizes that the factory edge that results will have a 90° angle.

An advantage of the first embodiment strip cutting device is that, in addition to comprising the cleaving apparatus, the first and second cutting wheels bound the feed channel and therefore help constrain orientation and location of L-shaped material as it feeds through the strip cutting device. Therefore, a desirable configuration of L-shaped material, where a first leg is disposed in the feed channel, is maintained in part by action of the cutting wheels as the L-shaped material is propelled through the cutting apparatus.

Figure 6A:
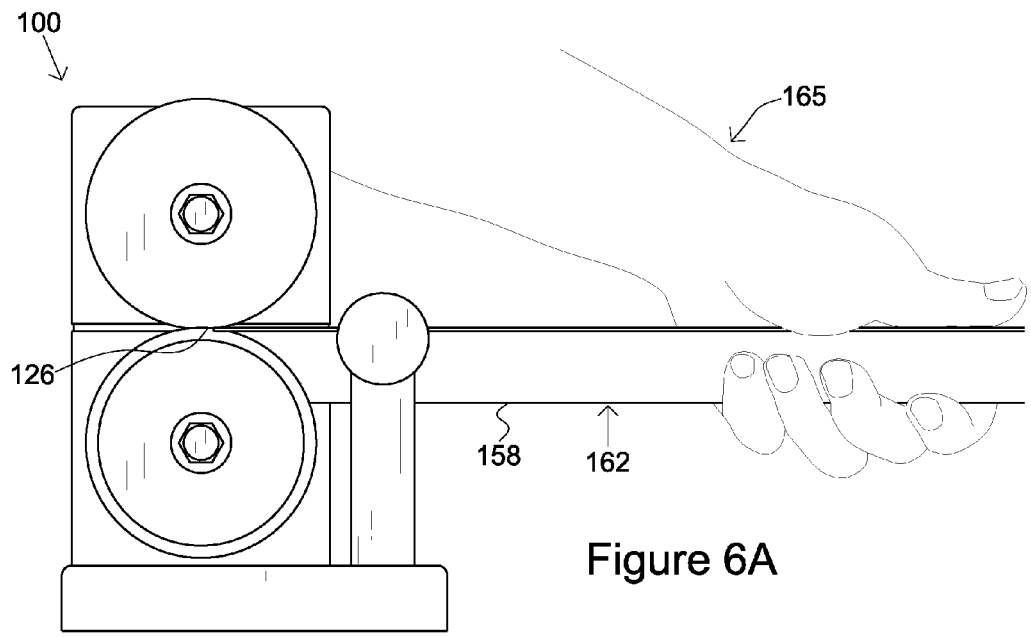
FIGS. 6A through 6D show a series of side views illustrating use of a strip cutting device according to one embodiment of the present invention.
Figure 6B:
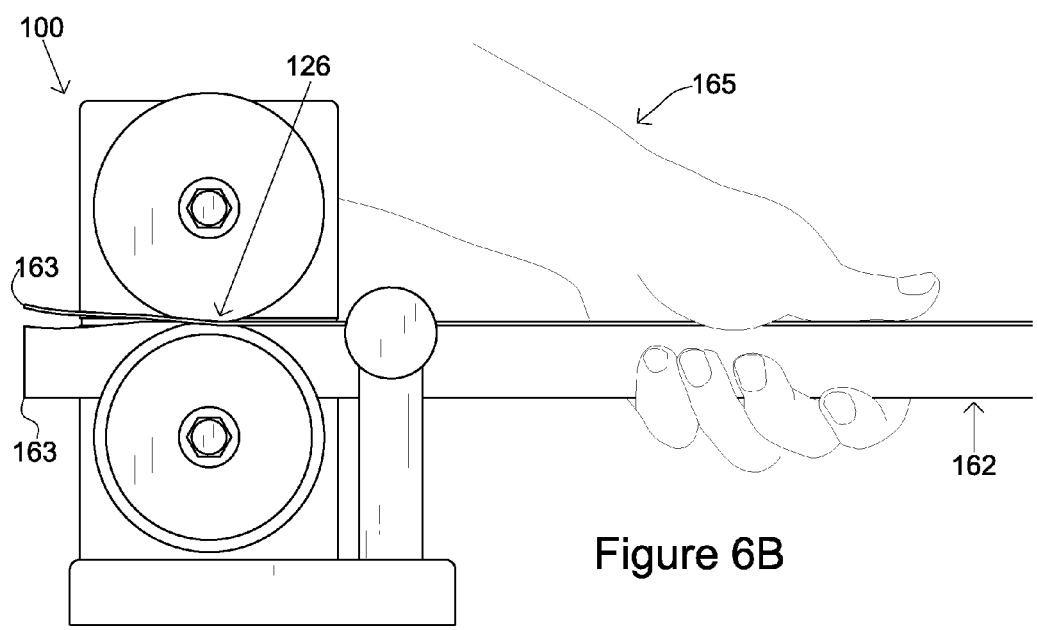

FIGS. 6A through 6D illustrate using the strip cutting device 100 for cleaving the piece of L-shaped material 162 to generate cropped trim 166 comprising two flat strips 163. FIG. 6A illustrates the piece of L-shaped material on the cusp of engaging the cleaving area 126. In this configuration, the first leg 158 is disposed in the feed channel, as shown in FIG. 4. However, the first leg is not visible in feed channel from the view illustrated in FIG. 6A. In FIG. 6B, a portion of the L-shaped material has been propelled by a user 165 into and through the strip cutting device, and the cleaving apparatus is beginning to cleave the L-shaped material, the two flat strips 163 of the cropped trim 166 emerging from the strip cutting device.

Figure 6C:
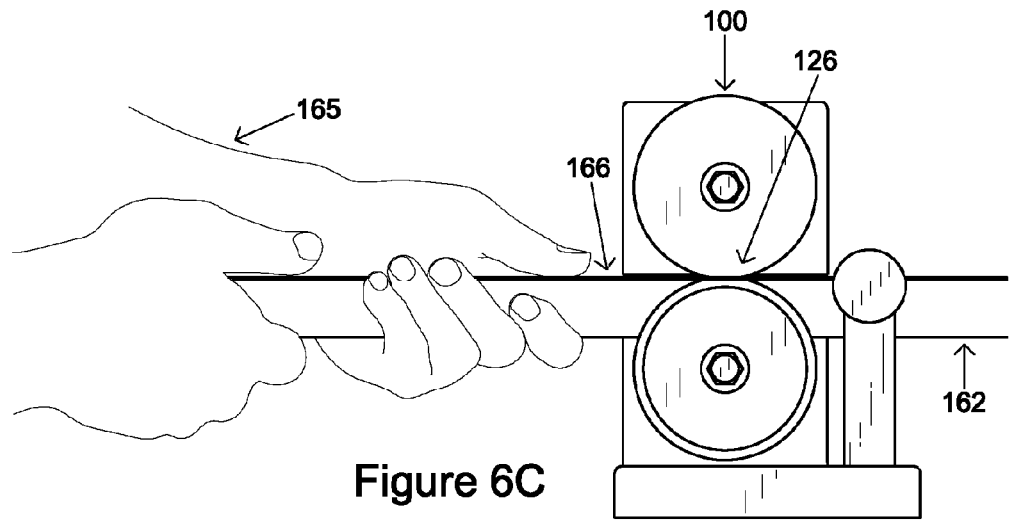

In FIG. 6C, about several inches of cropped trim 166 have emerged from the strip cutting device 100, providing a sufficient quantity of cropped trim for the user to grasp. Having grasped the cropped trim, the user readily pulls the piece of L-shaped material 162 through the strip cutting device as illustrated in FIG. 6D.

Figure 6D:
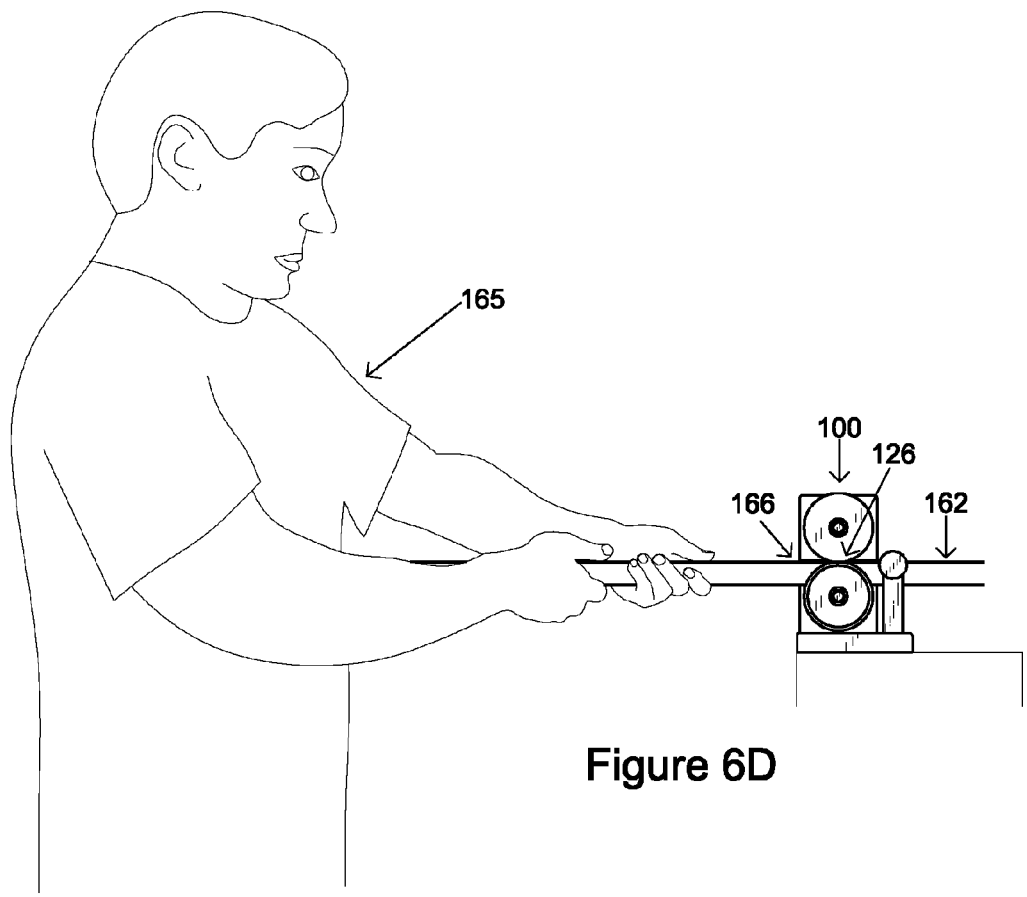

FIGS. 6C and 6D illustrate that once about several inches of cropped trim 166 have emerged from the strip cutting device 100, the user can grasp the cropped trim by hand, and readily draw the remaining portion of the piece of L-shaped material 162 through the device. Because the first leg is confined in the feed channel, the piece of L-shaped material is constrained to a proper position as it engages the cleaving area 126. Consequently, drawing the piece of L-shaped material through the device can be performed with relative ease and without great care, and an accurate, precise, cut, resulting in cropped trim with a factory edge, is typically produced.

FIGS. 7, 8, and 9A through 9D illustrate a first embodiment strip cutting device 100 excising the extraneous strip 168 from the flat strip 164 to produce the finishing trim 172 of desired width. The flat strip, as illustrated in FIG. 8, engages the cleaving area 126, and is supported by two placement grooves 132. A cutting angle illustrated in FIG. 7 is substantially 90°; that is, the cutting wheels 104, 108 engage the flat strip 164 at an angle of incidence of substantially 90°. A person or ordinary skill in the art recognizes that the factory edge that results will have a 90° angle. FIGS. 7 and 8 illustrate that the two placement grooves are disposed one on each of two jockey wheels 134. Each of the two jockey wheels is adjustably coupled to support posts 135 by adjustable arms 136. The two placement grooves are moveable along an adjustment line, the adjustment line being a straight line between the two placement grooves. A distance between the two placement grooves is thus adjustable to accommodate flat strips of varying widths.

The first embodiment placement grooves 132 and the jockey wheels 134 on which they reside are moved along the adjustment line by increasing or decreasing a length of adjustment arm 136 that extends inwardly (inwardly being toward an other of the two jockey assemblies 130) from the support posts. Movement of the placement grooves 132 along the adjustment line is achieved by turning adjustment knobs 137;

turning the adjustment knobs moves the adjustment arms 136 to extend inwardly by variable distances from the support posts 135.

Movement of the placement grooves 132 enables adjustment of a width distance, the width distance being a distance between the placement grooves on opposing jockey assemblies 135. Adjustment of the width distance facilitates securing flat strips of varied width in the placement grooves, the flat strips being disposed substantially between the jockey wheels 134 when the flat strip is secured in the placement grooves. Movement of the placement grooves along the adjustment line further enables adjustment of an approach alignment, the approach alignment being orientation of the flat strip in relation to the cleaving area 126 of the cleaving apparatus. A person of ordinary skill in the art, given the benefit of this disclosure, recognizes that adjustment of the approach alignment in a horizontal plane can adjust a width of the extraneous strip 168 that is excised from the flat strip to produce the finishing trim 172.

Figure 9A:
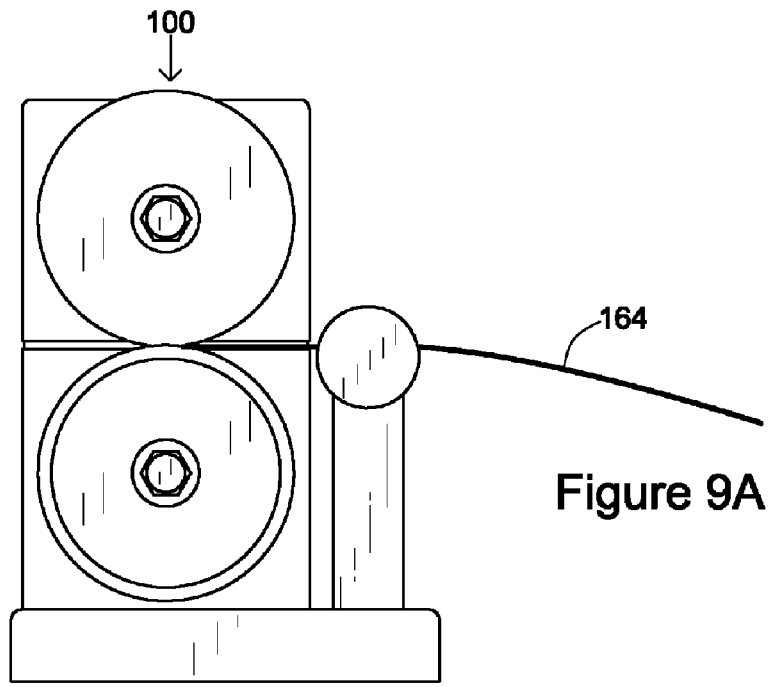
FIGS. 9A through 9C show a series of side views illustrating use of a strip cutting device according to one embodiment of the present invention.
Figure 9B:
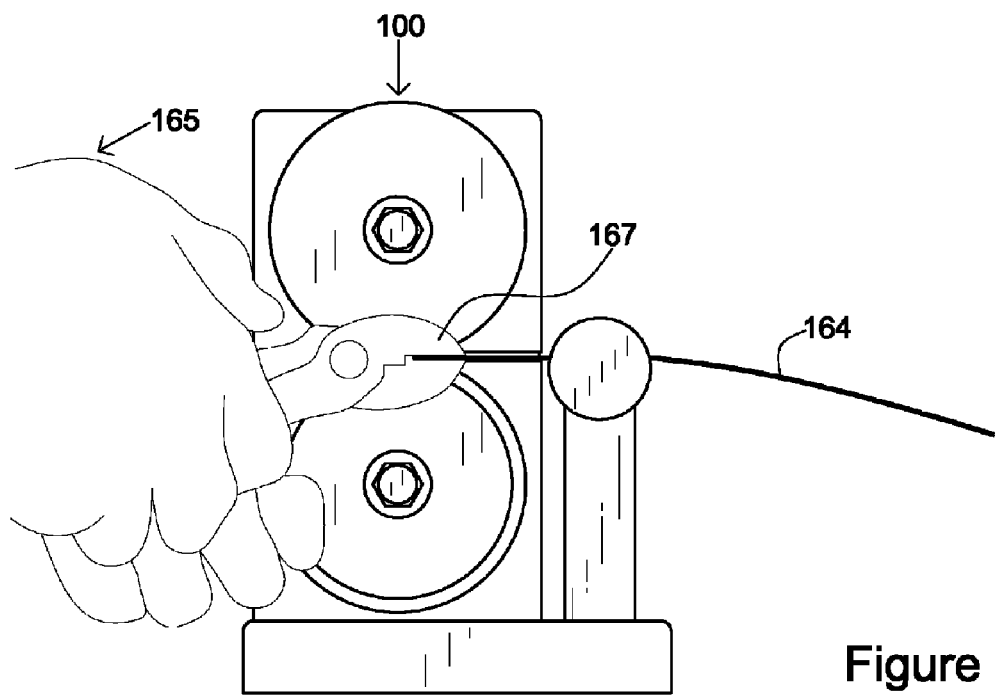

As best illustrated in FIGS. 7, 8, and 9A, once the flat strip 164 is secured in the placement grooves 132, the flat strip is readily propelled toward and into the lateral cavity 118, the jockey wheels 134 turning relatively freely on vertical axes as the flat strip progresses through the placement grooves toward the lateral cavity (118, best illustrated in FIG. 4) and the cleaving area 126. FIG. 9A illustrates the flat strip secured in the placement grooves and on the cusp of engaging the cleaving area 126; the flat strip is thus secured and precisely guided. FIG. 9B illustrates a user 165 grasping the flat strip with pliers 167 to propel the flat strip through the strip cutting device 100.

Figure 9C:
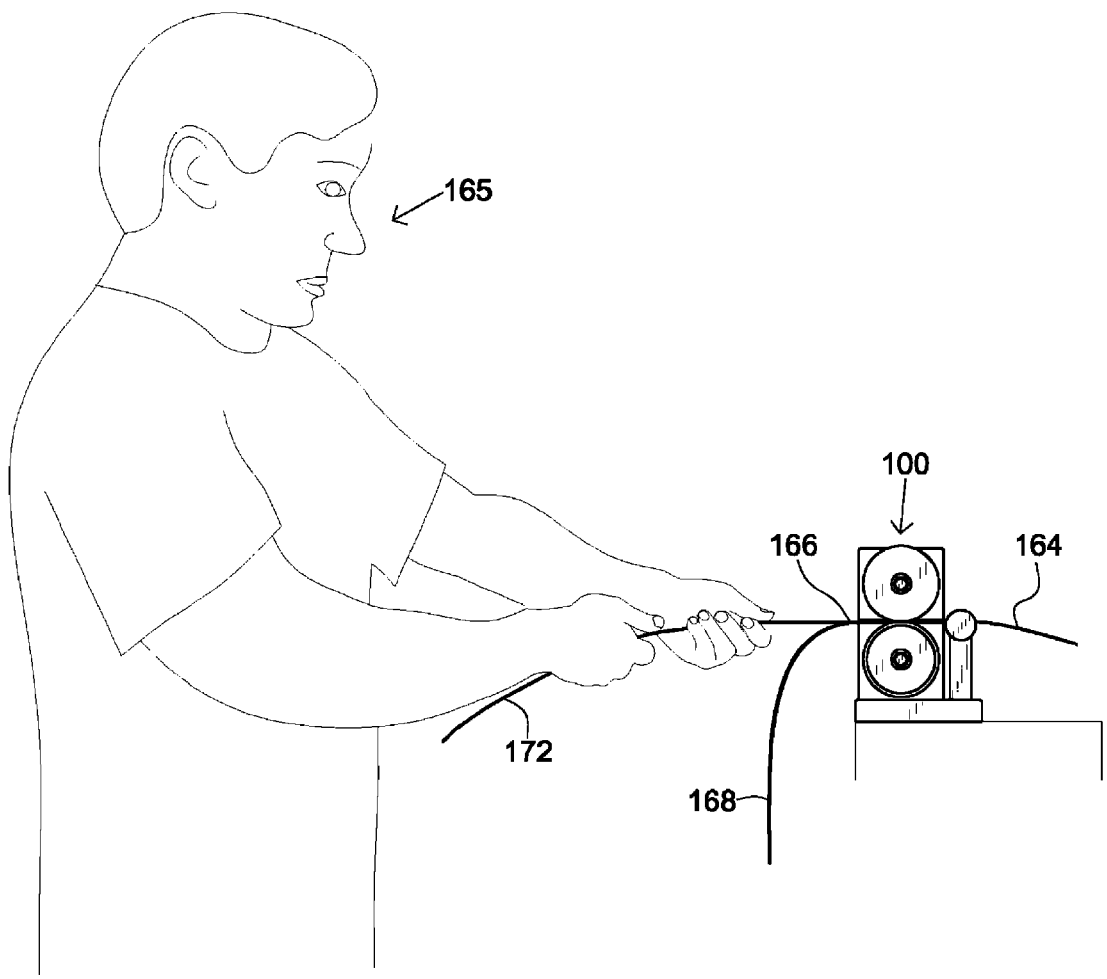

FIG. 9C illustrates the strip cutting device 100 with a substantial portion of the flat strip 164 having proceeded through the strip cutting device, and the extraneous strip 168 having been partially excised as the user easily propels the flat strip through the strip cutting device by grasping and pulling the finishing trim 172 that has emerged from the strip cutting device.

In a manner analogous to the method of excising a leg from L-shaped material illustrated in FIGS. 6A through 6D, once a few inches of cropped trim has emerged from the strip cutting device 100, the user can grasp the cropped trim by hand, and readily draw the remaining flat strip through the device. Because the flat strip is held by the jockey assemblies 130 at a proper approach alignment relative to the cleaving area 126, drawing the flat strip through the device can be performed without great care and produce an accurate, precise, cut, resulting in cropped trim with a freshly cut factory edge.

A Second Embodiment Strip Cutting Device

Figure 10:
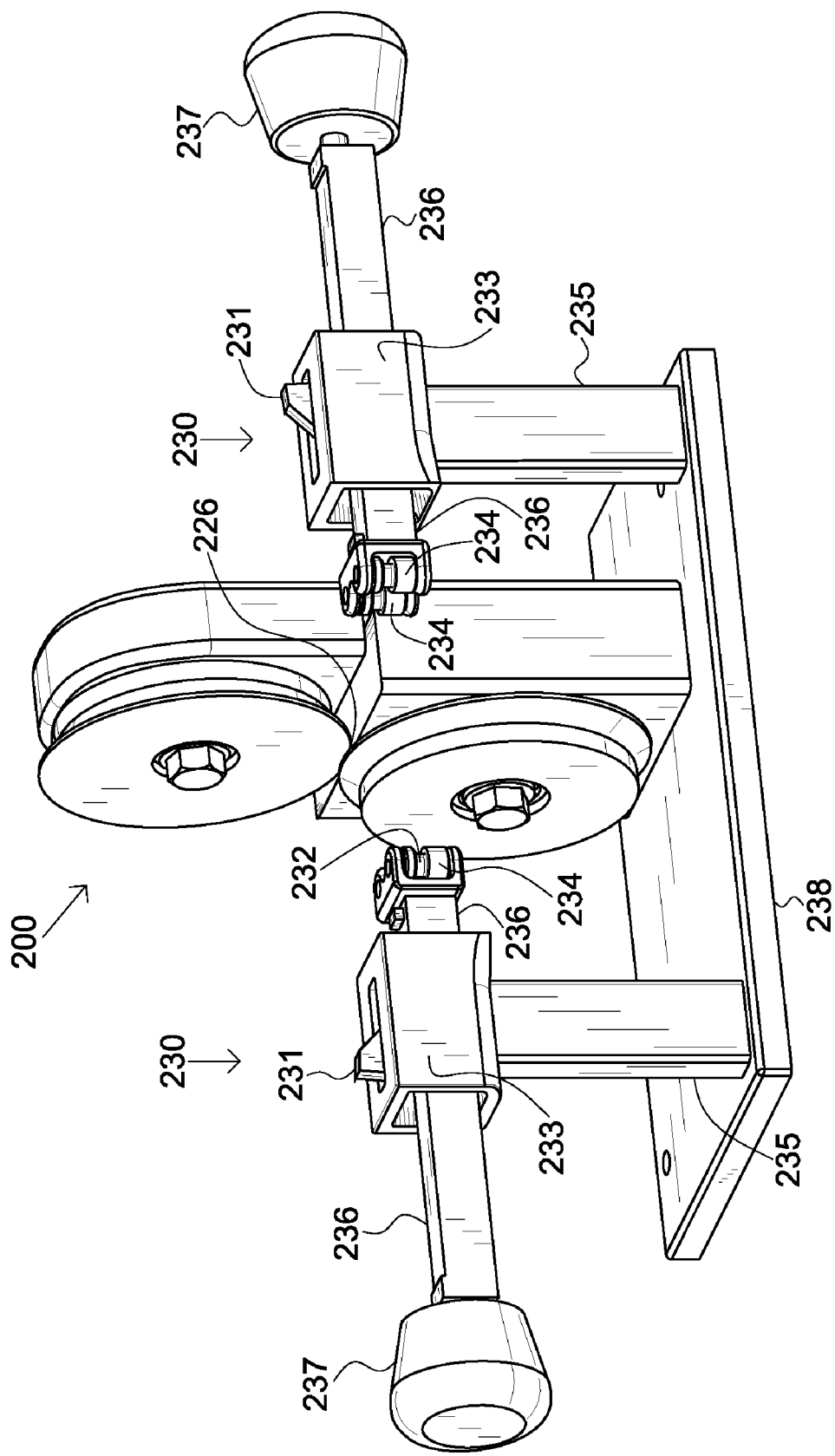
FIG. 10 is an isometric view of a strip cutting device according to one embodiment of the present invention.

A second embodiment strip cutting device 200 is illustrated in FIG. 10. The second embodiment strip cutting device is similar to the first embodiment strip cutting device, but with flat strip cutting means of the second embodiment comprising a multiple wheel jockey assemblies 230. The multiple wheel jockey assemblies of the second embodiment comprise two jockey wheels 234 on each of two multiple wheel jockey assemblies, four jockey wheels total; each jockey wheel comprises a placement groove 232. Two jockey wheels on each of two multiple wheel jockey assemblies results in flat trim feeding means that is adapted to better secure and precisely guide flat strips because the flat strip feeding means can hold flat strips more securely, and guide flat strips more precisely, than the single jockey wheel jockey assemblies 130 of the first embodiment.

The multiple wheel jockey assemblies 230 of the second embodiment further comprise quick release adjustment capability, which enables a user to quickly modify the width distance, which is the distance between placement grooves 232 on one multiple wheel jockey assembly and placement grooves on an opposing multiple wheel jockey assembly. Each multiple wheel jockey assembly of the second embodiment comprises an adjustment handle 237 disposed on a first end of an adjustment arm 236 and two jockey wheels 234 disposed on a second end of the adjustment arm. Each adjustment arm is adjustably coupled to a support post 235 by a quick release junction 233, each quick release junction comprising a release button 231 having a first and second position. The support posts secure the multiple wheel jockey assemblies to the base plate 238.

With its release button 231 in the first position, each quick release junction 233 secures its adjustment arm 236 in place. With its release button in the second position, typically achieved by a user pushing down on the release button, each quick release junction releases its adjustment arm sufficiently to permit that adjustment arm to move along an axis, the movement along the axis being toward or away from the opposing multiple wheel jockey assembly 230. By this action, jockey assemblies can accommodate and hold flat strips of different sizes, and adjust approach alignment of flat strips as they engage the cleaving area 226.

The quick release junctions 233 facilitate rapid and facile modification of placement groove 232 positions. Depressing the quick release button 231 allows the adjustment arm 236 to slide through the quick release junction to adjust lengths of adjustment arms on either side of support posts 235, thereby facilitating adjustment of placement grooves 232 along an adjustment line. Accordingly, the a distance between adjustment grooves of one jockey assembly 230 and adjustment grooves of the opposing jockey assembly can be adjusted to accommodate flat trims strips of varying widths.

In use, a user typically starts with jockey wheels 234 of one multiple wheel jockey assembly 230 and jockey wheels of the opposing multiple wheel jockey assembly about as far apart as they will go. The user then places a flat strip in position, depresses a quick release button 231, and adjusts the adjustment arm 236 of one multiple wheel jockey assembly 230 such that the placement grooves 232 of that multiple wheel jockey assembly engage a longitudinal edge of the flat strip. The user then adjusts the adjustment arm of the opposing multiple wheel jockey assembly in a similar, if not identical manner, such that the placement grooves of the opposing multiple wheel jockey assembly engage an other longitudinal edge of the flat strip. The adjustment arms are typically, but not necessarily, adjusted by pushing or pulling the adjustment knobs 237 disposed on the first ends of the adjustment arms.

The flat strip is thus disposed between jockey wheels 234 of one multiple wheel jockey assembly 230 and two jockey wheels of the opposing multiple wheel jockey assembly, longitudinal edges of the flat strip engaging placement grooves 232 on four jockey wheels. So disposed, the flat strip is relatively mobile along a longitudinal axis of the flat strip, but is relatively immobile along any axis not parallel to the longitudinal axis. Where the jockey wheels are properly positioned relative to the cleaving area 226, the flat trip strip has a proper approach alignment, and propelling the flat strip toward the cleaving area causes the flat strip to engage the cleaving area with a desired orientation, and relatively precise cleaving produces a factory edge on finishing trim (see 172 in FIGS. 8 and 9C) with a desired width.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For example, in some embodiments, the cutting wheels or the jockey wheels are driven by an electric motor or other power apparatus using a supplemental energy source such as, but not limited to, electricity or combustible fuel. The cleaving apparatus in some embodiments comprises one or more blades or similar cutting means, and some embodiments employ a reciprocating blade driven by an electric motor or other apparatus using supplemental power. As recognized by a person of ordinary skill in the art, where the strip cutting device does not comprise cutting wheels, one of the opposite sides and the top of the feed channel is provided by other structure. For instance, in embodiments similar to the first embodiment strip cutting device, but without the first or second cutting wheels, the one of the opposite sides and the top of the feed channel is provided by a portion of the mounting block, by a spring loaded structure adapted to press against the L-shaped material, or by a roller or wheel that is not a cutting wheel.

A property that these alternate embodiments share with the first embodiment strip cutting device is that they comprise a feed channel and cleaving apparatus, the feed channel being configured so that where a portion of a first leg of a piece of L-shaped material is disposed in the feed channel, the cleaving apparatus engages the L-shaped material at a desired location by default, the desired location being a junction of the first leg and the second leg, without careful attention by the cutting device user.

I claim:

1. A strip cutting device comprising:
a mounting block, the mounting block including substantially rigid material;
a cleaving apparatus, the cleaving apparatus including:
a first cutting wheel, the first cutting wheel being adapted to rotate and comprising a first axis of rotation and a first cutting edge, the first cutting edge residing at a circumference of the first cutting wheel;
a second cutting wheel, the second cutting wheel being coupled to the mounting block and being adapted to rotate relative to the mounting block, and the second cutting wheel including a second cutting edge, a second cutting wheel surface, and a second axis of rotation, the second cutting edge residing at a circumference of the second cutting wheel, the second cutting wheel surface being disposed on a plane that is substantially perpendicular to the second axis of rotation, and the second axis of rotation being substantially parallel with the first axis of rotation;
a feed channel, the feed channel comprising a cavity residing between the second cutting wheel and the mounting block and being bounded on a first side by the second cutting wheel surface and bounded on an opposite side by the mounting block, and the feed channel being open at a front end and a back end, the front and back ends residing along a feed channel longitudinal axis and at opposite ends of the feed channel, the feed channel longitudinal axis being substantially parallel to the second cutting wheel surface, wherein the mounting block further comprises a planar wall surface, the planar wall surface (i) being substantially parallel with the second cutting wheel surface and (ii) being a portion of the mounting block that bounds the opposite side, and wherein the planar wall surface extends substantially parallel to and beyond the entire second cutting wheel surface to create the feed channel.

2. The strip cutting device of claim 1, wherein:
a distance between the first axis of rotation and the second axis of rotation is less than a sum of a radius of the first cutting wheel plus a radius of the second cutting wheel; and
the feed channel is bounded on a third side by the circumference of the first cutting wheel, the third side being immediately adjacent to the first side.

3. The strip cutting device of claim 2, wherein:
the feed channel has a feed channel width that falls in a range between 0.01 inch and 0.50 inch, the feed channel width being a distance between the second cutting wheel surface and the planar wall surface.

4. The strip cutting device of claim 3, further comprising a lateral cavity, the lateral cavity (i) being different from the feed channel, (ii) intersecting the feed channel, and (iii) bounded on opposite sides by substantially rigid walls and open on opposite ends, the opposite ends residing along a lateral cavity longitudinal axis and the lateral cavity longitudinal axis being substantially parallel to the feed channel longitudinal axis, and wherein the first cutting wheel and the second cutting wheel are coupled directly to a same side of the mounting block.

5. The strip cutting device of claim 2, further comprising a cleaving area, the cleaving area including the first cutting edge and the second cutting edge where the first cutting edge overlaps the second cutting edge by between about 1/64 inch and about 1/4 inch.

6. The strip cutting device of claim 2, wherein the strip cutting device is securely mounted to a support means.

7. The strip cutting device of claim 6, wherein the support means is selected from a group consisting of a sawhorse, table, bench, truck bed, vehicle bumper, and a trailer.

8. A strip cutting combination comprising:
a strip cutting device, the strip cutting device including:
a first cutting wheel, the first cutting wheel being adapted to rotate and comprising a first axis of rotation and a first cutting edge, the first cutting edge residing at a circumference of the first cutting wheel;
a second cutting wheel, the second cutting wheel including a second cutting edge, a second cutting wheel surface, and a second axis of rotation, the second cutting edge residing at a circumference of the second cutting wheel, the second cutting wheel surface being substantially perpendicular to the second axis of rotation, and the second axis of rotation being substantially parallel with the first axis of rotation;
a feed channel, the feed channel comprising a cavity residing between the second cutting wheel and the mounting block and being bounded on a first side by the second cutting wheel surface and bounded on an opposite side by the mounting block, and the feed channel being open at a front end and a back end, the front and back ends residing along a feed channel longitudinal axis and at opposite ends of the feed channel, the feed channel longitudinal axis being substantially parallel to the second cutting wheel surface, wherein the mounting block further comprises a planar wall surface, the planar wall surface (i) being substantially parallel with the second cutting wheel surface and (ii) being a portion of the mounting block that bounds the opposite side, and wherein the planar wall surface extends substantially parallel to and beyond the entire second cutting wheel surface to create the feed channel; and a piece of L-shaped material, the piece of L-shaped material including a first leg, a second leg, and an intersection where the first leg joins the second leg at an angle of about 90 degrees, a portion of the first leg residing in the feed channel, and the first cutting edge and the second cutting edge residing at the intersection.

9. The strip cutting combination of claim 8, wherein the second leg resides outside the feed channel.

10. The strip cutting combination of claim 9, wherein the L-shaped material consists essentially of vinyl.

11. The strip cutting combination of claim 10, wherein the first leg has a first leg width that falls in a range between about ½ inch and about 3 inches and the second leg has a second leg width that falls in a range between about ½ inch and about 3 inches.

12. The strip cutting combination of claim 8, wherein:
   a distance between the first axis of rotation and the second axis of rotation is less than a sum of a radius of the first cutting wheel plus a radius of the second cutting wheel; and
   the feed channel is bounded on a third side by the circumference of the first cutting wheel, the third side being immediately adjacent to the first side.

13. The strip cutting combination of claim 11, wherein the feed channel has a feed channel width that falls in a range between 0.010 inch and 0.50 inch, the feed channel width being a distance between the second cutting wheel surface and the mounting block.

14. The strip cutting combination of claim 13, wherein the strip cutting device is securely mounted to a support structure, the support structure being selected from a group consisting of a sawhorse, table, bench, truck bed, vehicle bumper, and a trailer.

15. A strip cutting combination comprising:
   a strip cutting device, the strip cutting device including;
      a mounting block, the mounting block including substantially rigid material;
      a cleaving apparatus, the cleaving apparatus including:
         a first cutting wheel, the first cutting wheel being adapted to rotate and comprising a first axis of rotation and a first cutting edge, the first cutting edge residing at a circumference of the first cutting wheel;
         a second cutting wheel, the second cutting wheel being coupled to the mounting block and being adapted to rotate relative to the mounting block, and the second cutting wheel including a second cutting edge, a second cutting wheel surface, and a second axis of rotation, the second cutting edge residing at a circumference of the second cutting wheel, the second cutting wheel surface being disposed on a plane that is substantially perpendicular to the second axis of rotation, and the second axis of rotation being substantially parallel with the first axis of rotation;
      a feed channel, the feed channel comprising a cavity residing between the second cutting wheel and the mounting block and being bounded on a first side by the second cutting wheel surface and bounded on an opposite side by the mounting block, and the feed channel being open at a front end and a back end, the front and back ends residing along a feed channel longitudinal axis and at opposite ends of the feed channel, the feed channel longitudinal axis being substantially parallel to the second cutting wheel surface, wherein the mounting block further comprises a planar wall surface, the planar wall surface (i) being substantially parallel with the second cutting wheel surface and (ii) being a portion of the mounting block that bounds the opposite side, and wherein the planar wall surface extends substantially parallel to and beyond the entire second cutting wheel surface to create the feed channel;
      a lateral cavity, the lateral cavity (i) being different from the feed channel, (ii) intersecting the feed channel, and (iii) bounded on opposite sides by substantially rigid walls and open on opposite ends, the opposite ends residing along a lateral cavity longitudinal axis, and the lateral cavity longitudinal axis being substantially parallel to the feed channel longitudinal axis; and
   a flat strip, a portion of the flat strip residing in the lateral cavity, and the first cutting edge and the second cutting edge cutting the flat strip.

16. The strip cutting combination of claim 15, wherein the flat strip consists essentially of vinyl and is between 1 inch and 3 inches wide.

17. The strip cutting combination of claim 16, wherein the strip cutting device further comprises:
   a plurality of jockey wheels, each of the plurality of jockey wheels including (i) an axis of rotation, about which the each of the plurality of jockey wheels is adapted to rotate, the axis of rotation being substantially parallel to the second cutting wheel surface and substantially perpendicular to the feed channel longitudinal axis and (ii) a placement groove, the placement groove circumscribing the each of the plurality of jockey wheels and residing in a groove plane, the lateral cavity longitudinal axis residing in the groove plane.

18. The strip cutting combination of claim 17, wherein:
   a portion of a first edge of the flat strip resides in at least one of the placement grooves and a portion of a second edge of the flat strip resides in at least one of the placement grooves, the first edge being substantially parallel to the second edge; and
   the jockey wheels are adapted to adjust along an adjustment line, the adjustment line (i) being perpendicular to the longitudinal axis of the lateral cavity and (ii) residing in the groove plane.

\* \* \* \* \*